US012365406B2

(12) United States Patent
Zhang et al.

(10) Patent No.: US 12,365,406 B2
(45) Date of Patent: Jul. 22, 2025

(54) COMPONENT MONITORING BASED ON MAGNETIC SIGNALS (71) Applicant: Caterpillar Inc., Peoria, IL (US)

(72) Inventors: Li Zhang, Dunlap, IL (US); Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 470 days.

(21) Appl. No.: 17/445,359

(22) Filed: Aug. 18, 2021

(65) Prior Publication Data
US 2023/0060000 A1    Feb. 23, 2023

(51) Int. Cl.
*B62D 55/32* (2006.01)
*G01B 7/26* (2006.01)
*G07C 5/00* (2006.01)
*G07C 5/08* (2006.01)

(52) U.S. Cl.
CPC .............. *B62D 55/32* (2013.01); *G01B 7/26* (2013.01); *G07C 5/006* (2013.01); *G07C 5/0808* (2013.01); *G07C 5/0816* (2013.01)

(58) Field of Classification Search
CPC .......... B62D 55/32; B62D 55/21; G01B 7/26; G07C 5/006; G07C 5/0808; G07C 5/0816; E02F 3/76
See application file for complete search history.

(56) References Cited

U.S. PATENT DOCUMENTS

| | | |
|---|---|---|
| 9,030,324 B2 | 5/2015 | Christiansen et al. |
| 9,475,526 B2 | 10/2016 | McKinley et al. |
| 2002/0116992 A1* | 8/2002 | Rickel .................. F16D 66/026 73/146 |
| 2006/0124214 A1 | 6/2006 | Bauchot et al. |
| 2006/0208902 A1 | 9/2006 | Brey |
| 2006/0226984 A1 | 10/2006 | Menke |
| 2011/0260834 A1 | 10/2011 | Chapman et al. |
| 2015/0122693 A1* | 5/2015 | Deutschle ............... B65D 1/36 53/471 |
| 2016/0101426 A1* | 4/2016 | Heinrichs ............... B02C 17/16 241/172 |
| 2017/0036219 A1 | 2/2017 | Peasley et al. |

(Continued)

FOREIGN PATENT DOCUMENTS

| | | |
|---|---|---|
| DE | 102015114439 A1 | 3/2017 |
| EP | 2865989 | 4/2015 |

(Continued)

*Primary Examiner* — Yufeng Zhang (57) ABSTRACT

A system may include a first device and a second device. The first device may be configured to be associated with a component of a machine. The second device may be configured to provide one or more interrogation magnetic signals to the first device; and determine, based on providing the one or more interrogation magnetic signals, whether a response magnetic signal is received from the first device. The second device may selectively provide first wear information indicating a first amount of wear of the component or second wear information indicating a second amount of wear of the component. The first information may be provided when the response magnetic signal is received from the first device. The second wear information may be provided when the response magnetic signal is not received from the first device. The second amount of wear may exceed the first amount of wear.

20 Claims, 4 Drawing Sheets

(56) References Cited

U.S. PATENT DOCUMENTS

| | | |
|---|---|---|
| 2017/0073936 A1 | 3/2017 | Johnson et al. |
| 2017/0076512 A1 | 3/2017 | Johnson et al. |
| 2018/0171772 A1 | 6/2018 | Rodney |
| 2019/0356552 A1 | 11/2019 | Ricci |

FOREIGN PATENT DOCUMENTS

| | | |
|---|---|---|
| WO | 2013/117563 A2 | 8/2013 |
| WO | 2016099796 | 6/2016 |
| WO | 2019/097556 A1 | 5/2019 |

* cited by examiner

COMPONENT MONITORING BASED ON MAGNETIC SIGNALS

TECHNICAL FIELD

The present disclosure relates generally to monitoring components of a machine and, for example, to monitoring the components based on magnetic signals.

BACKGROUND

Components, of an undercarriage assembly of a machine, may wear over a period of time. One technique for detecting wear of the components involves the use of a Radio Frequency Identification (RFID) system. In other words, an amount of wear of the components may be measured using the RFID system. As an example, RFID tags may be embedded in the components and the RFID tags may communicate with an RFID reader using electromagnetic signals. For example, the RFID tags may communicate information regarding the amount of wear of the components.

In some instances, the components may comprise a metal. The metal may reflect electromagnetic energy and cause an interference with the electromagnetic signals. As a result, the amount of wear measured by the RFID system may be inaccurate. Inaccurate measurements of the amount of wear of the components may result in incorrect predictions regarding the amount of wear of the components. As a result of such incorrect predictions, the components may either fail prematurely or may be repaired or replaced prematurely (e.g., because the components may not be sufficiently worn to require replacement or repair). Such premature failure of the components or premature replacement or repair of the components may also negatively affect productivity the machine at a work site.

U.S. Patent Application Publication No. 20180171772 (the '772 publication) discloses apparatus and methods to estimate properties of rock, drill bit, or a combination thereof associated with a drilling operation. The '772 publication further discloses that the properties can include, but are not limited to, rock chip size, drill bit dullness, drilling efficiency, or a combination selected from rock chip size, drill bit dullness, and drilling efficiency. The '772 publication further discloses that the estimate may be accomplished from correlating detected acoustic emission with detected electromagnetic emissions.

While the '772 publication discloses estimating properties such as a combination selected from rock chip size, drill bit dullness, and drilling efficiency, the '772 publication specifically refers to electromagnetic emissions. As explained above, metal may cause an interference with electromagnetic signals.

The present disclosure solves one or more of the problems set forth above and/or other problems in the art.

SUMMARY

A system, comprising: a first device configured to be associated with a component of a machine; and a second device configured to: provide one or more interrogation magnetic signals to the first device; determine, based on providing the one or more interrogation magnetic signals, whether a response magnetic signal is received from the first device; and selectively provide first wear information indicating a first amount of wear of the component or second wear information indicating a second amount of wear of the component, wherein the first information is provided when the response magnetic signal is received from the first device, wherein the second wear information is provided when the response magnetic signal is not received from the first device, and wherein the second amount of wear exceeds the first amount of wear.

A component of a machine, the component comprising: a body; and at least one of: a first device configured to provide a first response magnetic signal associated with a first amount of wear of the component, wherein the first device is configured to provide the first response magnetic signal based on a first interrogation magnetic signal; or a second device configured to provide a second response magnetic signal associated with a second amount of wear of the component, wherein the second device is configured to provide the second response magnetic signal based on a second interrogation magnetic signal.

A machine, comprising: a component; a first device associated with the component; a second device configured to: provide one or more interrogation magnetic signals to the first device; determine, based on providing the one or more interrogation magnetic signals, whether a response magnetic signal is received from the first device; provide first wear information indicating a first amount of wear of the component based on the response magnetic signal being received from the first device; and provide second wear information indicating a second amount of wear of the component based on the response magnetic signal not being received from the second device; and a controller configured to cause an action to be performed based on the first wear information or the second wear information.

DETAILED DESCRIPTION

The present disclosure is directed to using devices, that communicate using magnetic signals, to monitor a component of a machine. For example, the devices may be used to generate information that may be used to determine an amount of wear of a component and to track the component (e.g., to determine whether the component has been installed and/or replaced). The component may be a component that is subject to wear. For example, the component may be a component of an undercarriage assembly, such as a roller, an idler, a track link, a track link bushing, and/or a sprocket segment, among other examples. The component may include a metal.

The devices may communicate using a near-field magnetic signaling communication protocol. For instance, the devices may communicate in accordance with the Institute of Electrical and Electronics Engineers (IEEE) 1902.1 standard. Unlike electromagnetic signals, the magnetic signals are not subject to interference that may be caused by a metal. For instance, the magnetic signals (generated by the devices) are volumetric magnetic waves that penetrate metal (e.g., steel), water, and/or people. In contrast, electromagnetic signals (generated by RFID devices) are line-of-sight electromagnetic waves that are reflected by metal, water, and/or people and that are subject to delays. Accordingly, such electromagnetic signals are subject to inaccuracies. In some examples, the devices may include tags (e.g., RuBee tags or RuBee responders) and readers (e.g., RuBee tag readers or RuBee controllers). The devices (e.g., RuBee tags and RuBee responders) may utilize a two-way wireless communication protocol for harsh environments.

In some implementations, one or more devices (e.g., RuBee tags) may be embedded, in a cavity of the component, at one or more different depths with respect to a wear surface of the component. Each depth may be associated with a different amount of wear of the component. For example, a first device (e.g., a RuBee tag) may be embedded, in the cavity of the component, at a first depth with respect to the wear surface of the component. The first depth may be associated with a first amount of wear of the component. A second device (e.g., a RuBee reader) may be provided on the machine. The second device may provide one or more interrogation magnetic signals to the first device. The second device may determine, based on providing the one or more interrogation magnetic signals, whether a response magnetic signal is received from the first device.

Receiving a response magnetic signal from the first device may indicate that the first device is still embedded in the cavity and that the component has not experienced wear to the first depth (e.g., the component has not been worn away to the first depth). Conversely, as the component experiences wear to the first depth, the first device may be removed from the cavity (e.g., fall out of the cavity) and/or may be damaged. As a result, the first device may be unable to communicate with the second device. In this regard, not receiving the response magnetic signal may indicate that the first device has been removed from the cavity and that the component has experienced wear to the first depth.

The second device may provide (e.g., to a controller of the machine and/or to a back office system associated with the machine) information indicating an amount of wear of the component based on whether the second device is able to communicate with the first device. For example, the second device may provide first wear information indicating a first amount of wear of the component based on the response magnetic signal being received from the first device. Alternatively, the second device may provide second wear information indicating a second amount of wear of the component based on the response magnetic signal not being received from the first device.

The second amount of wear may exceed the first amount of wear. The first amount of wear may correspond to the component not being worn away to the first depth. The second amount of wear may correspond to the component being worn away to the first depth. In some examples, based on the response magnetic signal, the second device may provide information that may be used to determine when the component is installed on the machine and/or when the component has been replaced on the machine.

The second device may perform similar actions with respect to a second tag at a second depth, a third tag at a third depth, and so on. As explained above, the first device and the second device may communicate using magnetic signals. Unlike electromagnetic signals, the magnetic signals are not subject to interference that may be caused by the metal included in the component. As a result, the metal may not affect an accuracy of the wear information indicating the amount of wear of the component. Accordingly, the component may not be subject to premature failure or subject to premature repair or replacement.

The term "machine" may refer to a machine that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
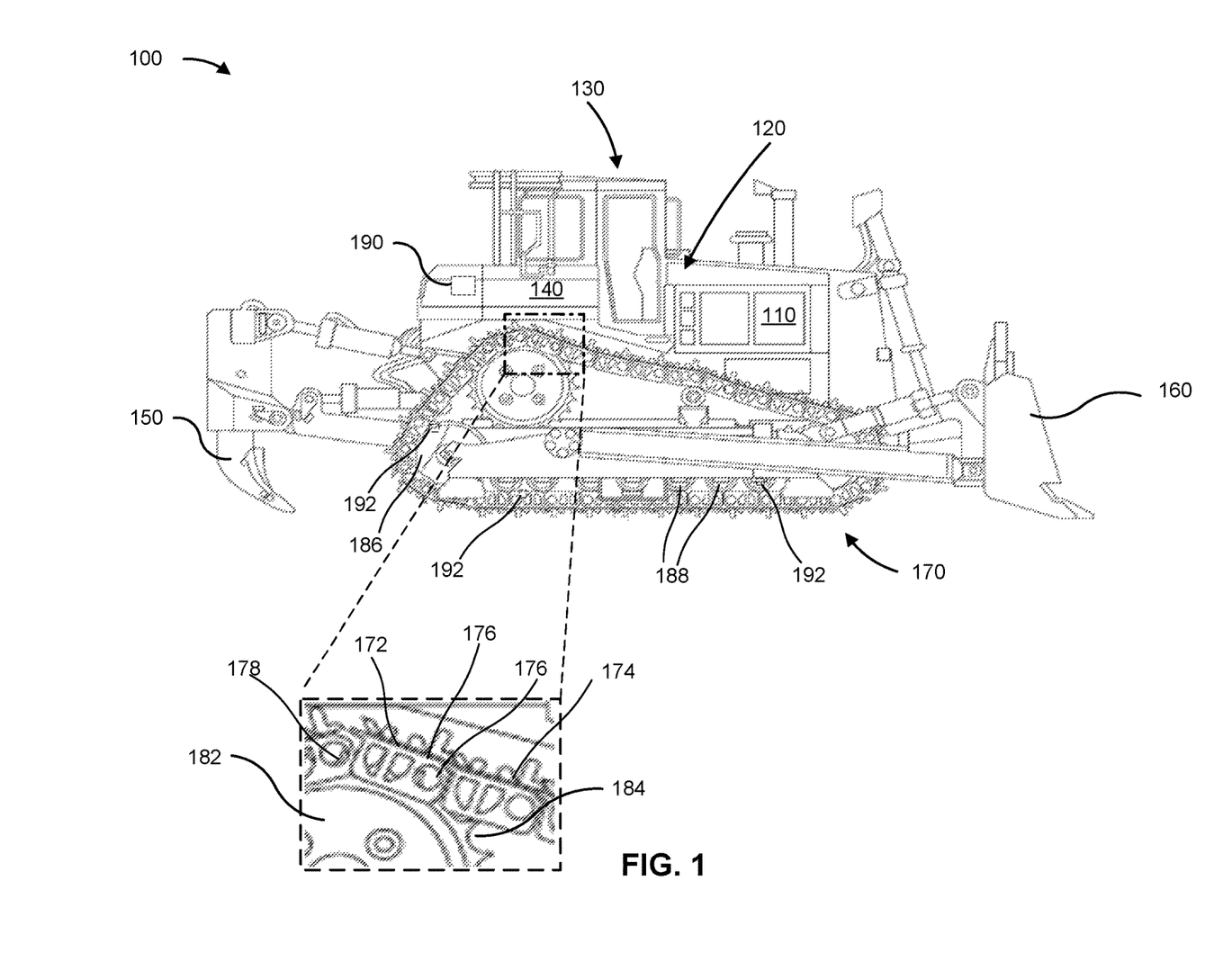
FIG. 1 is a diagram of an example machine described herein.

FIG. 1 is a diagram of an example machine 100 described herein. As shown in FIG. 1, machine 100 is embodied as an earth moving machine, such as a dozer. Alternatively, machine 100 may be another type of track-type machine such as an excavator.

As shown in FIG. 1, machine 100 includes an engine 110, a sensor system 120, an operator cabin 130, operator controls 135, a controller 140, a rear attachment 150, a front attachment 160, ground engaging members 170, sprocket 182, one or more idlers 186, one or more rollers 188, a reader device 190, and responder devices 192 (referred to herein individually as "responder device 192," and collectively as "responder devices 192").

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a vibration sensor device, a speed sensor device, a motion sensor device, among other examples. As an example, the sensor devices may include one or more inertial measurement units (IMUs).

Operator cabin 130 includes an integrated display (not shown) and operator controls 135. Operator controls may include one or more input components (e.g., integrated joysticks, push-buttons, control levers, and/or steering wheels) to control an operation of machine 100. For example, operator controls 135 may be used to control an operation of one or more implements of machine 100 (e.g., rear attachment 150 and/or front attachment 160) and/or control an operation of ground engaging members 170.

For an autonomous machine, operator controls may not be designed for use by an operator and, rather, may be designed to operate independently from an operator. In this case, for example, operator controls may include one or more input components that provide an input signal for use by another component without any operator input.

Controller 140 (e.g., an electronic control module (ECM)) may control and/or monitor operations of machine 100. For example, controller 140 may control and/or monitor the operations of machine 100 based on signals from operator controls 135, from sensor system 120, and/or from reader device 190. Controller 140 may determine an amount of wear of one or more components of machine 100 based on the signals from sensor system 120, from operator controls 135, and/or from reader device 190, as described in more detail below.

Rear attachment 150 may include a ripper assembly, a winch assembly, and/or a drawbar assembly. Front attachment 160 may include a blade assembly. Ground engaging members 170 may be configured to propel machine 100. Ground engaging members 170 may include wheels, tracks, rollers, and/or similar components, for propelling machine 100. Ground engaging members 170 may include an undercarriage that includes tracks (as shown in FIG. 1). The tracks may include track links. In some situations, track link may include a track link bushing and a track link pin. As an example, the tracks may include a first track link 172 and a second track link 174. First track link 172 includes a first track link bushing 176 and a first track link pin 178. Second track link 174 includes a second track link pin 180.

Sprocket 182 may include one or more sprocket segments 184 (referred to herein individually as "sprocket segment 184," and collectively as "sprocket segments 184"). Sprocket 182 may be configured to engage with ground engaging members 170 and to drive ground engaging members 170. For example, sprocket segments 184 may be configured to engage track link bushings (e.g., of the tracks of ground engaging members 170) and rotate to cause the tracks to propel machine 100. In some examples, one or more idlers 186 and/or one or more rollers 188 may guide the tracks as the tracks rotate to propel machine 100. In some examples, ground engaging members 170, sprocket 182, one or more idlers 186, and one or more rollers 188 may be components of the undercarriage assembly. The undercarriage assembly may further include one or more track pads and/or one or more track shoes.

Reader device 190 may include one or more devices that are configured to provide wear information regarding the one or more components. The wear information may indicate an amount of wear of the one or more components. In some situations, the wear information may include information (e.g., timestamps) that may be used to determine when the one or more components are installed on machine 100 and/or when the one or more components have been replaced on machine 100.

Reader device 190 may generate the wear information based on communicating with one or more responder devices 192 associated with the one or more components. Reader device 190 may communicate with one or more responder devices 192 using a near-field magnetic signaling communication protocol. For instance, reader device 190 may communicate with one or more responder devices 192 in accordance with the Institute of Electrical and Electronics Engineers (IEEE) 1902.1 standard.

In some implementations, reader device 190 may provide one or more interrogation magnetic signals to responder device 192 to cause responder device 192 to provide a response magnetic signal (responsive to the one or more interrogation magnetic signals). The response magnetic signal may be used to generate the wear information. Reader device 190 may determine whether the response magnetic signal is received from responder device 192. Reader device 190 may generate and provide the wear information based on whether the response magnetic signal is received from responder device 192, as explained in more detail below.

Responder device 192 may include one or more devices that are configured to provide the response magnetic signal to reader device 190. Responder device 192 may communicate with reader device 190 using a near-field magnetic signaling communication protocol. For instance, responder device 192 may communicate with reader device 190 in accordance with the IEEE 1902.1 standard.

Responder device 192 may be configured to be associated with a component of machine 100. In some examples, the response magnetic signal may include information identifying responder device 192, information identifying the component, information identifying a location of responder device 192 on the component, information identifying a timestamp associated with the response signal, among other examples. The information identifying responder device 192 may include information identifying a manufacturer of responder device 192, information identifying a model of responder device 192, information identifying a serial number of responder device 192, among other examples.

The information identifying the component may include information identifying a manufacturer of the component, information identifying a model of the component, information identifying a part number of the component, information identifying a serial number of the component, information identifying a date and/or a time when the component was installed on machine 100, among other examples. In some examples, the information identifying responder device 192, the information identifying the component, the information identifying the location of responder device 192 on the component, and/or the information identifying the timestamp may be included in the wear information provided by reader device 190.

Responder device 192 may be configured to provide the response magnetic signal periodically (e.g., every 3 hours, every shift, every day, among other examples). Additionally, or alternatively, responder device 192 may be configured to provide the response magnetic signal based on a trigger (e.g., based on receiving an interrogation magnetic signal).

In some situations, responder device 192 may be a device that consumes minimal power. Responder device 192 may include a power source, such as a battery that may last approximately five years to fifteen years. Responder device 192 may include a device that is configured to generate the timestamp and one or more memories configured to store the information identifying the manufacturer of the component, the information identifying the model of the component, and/or the information identifying the serial number of the component. Responder device 192 may include one or more sensor devices, such as a vibration sensor device, a speed sensor device, a motion sensor device, among other examples. The response magnetic signal may include sensor data from the one or more sensor devices.

As indicated above, FIG. 1 is provided as an example. Other examples may differ from what was described in connection with FIG. 1.

Figure 2:
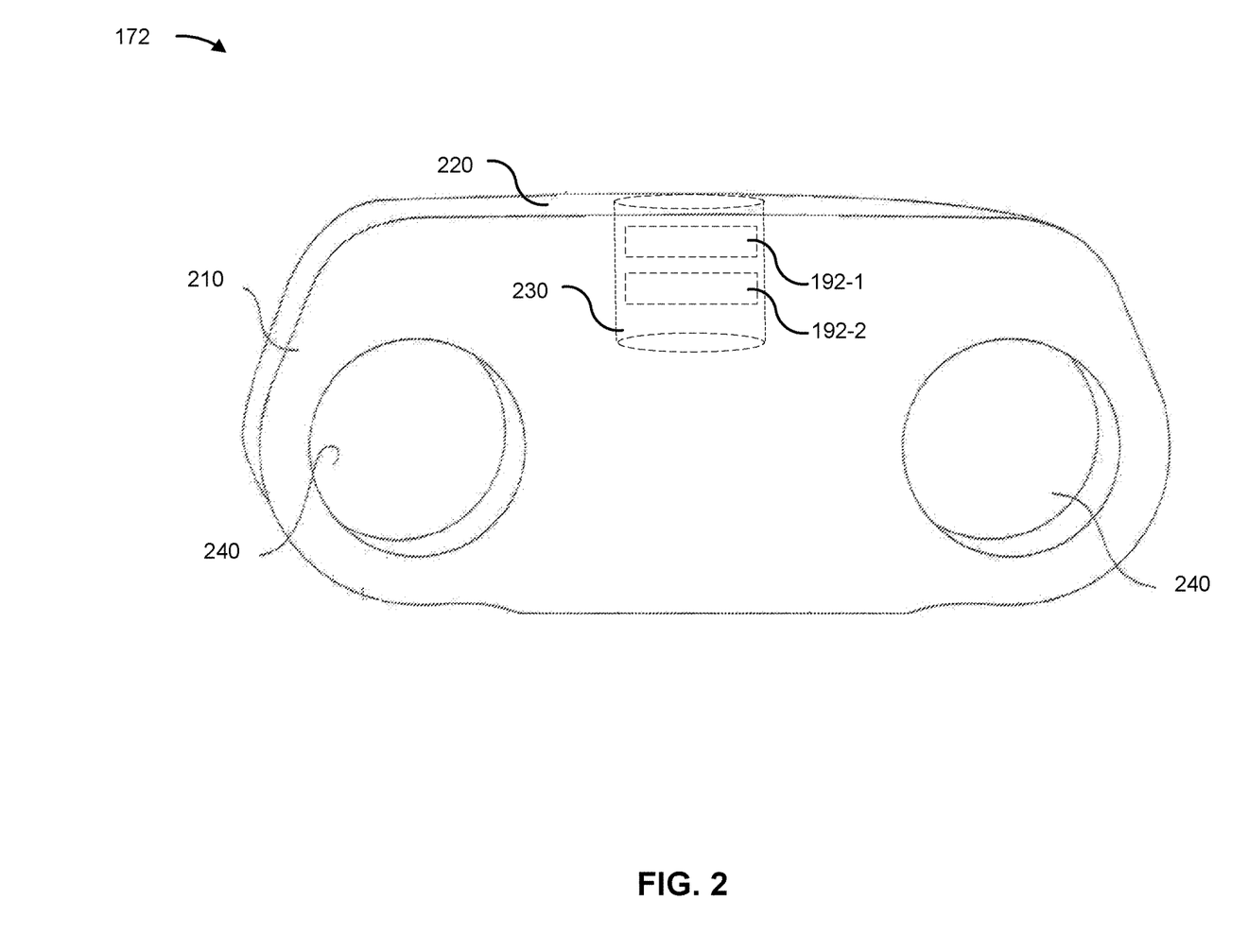
FIG. 2 is a diagram of an example component of the example machine described herein.

FIG. 2 is a diagram of an example component of machine 100 described herein. The example component is illustrated as first track link 172. As shown in FIG. 2, first track link 172 may include a body 210. Body 210 may comprise a metal. The metal may include steel, aluminum, among other examples. Additionally, or alternatively, body 210 may comprise a rubber material.

As shown in FIG. 2, body 210 may include a wear surface 220, a cavity 230, and track through holes 240 configured to received track link pins. Wear surface 220 may include any surface of body 210 in which material wears away during use of the undercarriage assembly. For example, wear surface 220 may be a surface in which material is worn away through contact with other components of the undercarriage assembly and/or with external materials (e.g., a ground surface).

Cavity 230 may be configured to receive one or more responder devices 192. As shown in FIG. 2, for example, cavity 230 is configured to receive responder device 192-1 and responder device 192-2. While FIG. 2 illustrates that cavity 230 has received responder device 192-1 and responder device 192-2, in some other examples, cavity 230 may receive additional or fewer responder devices 192. The responder devices 192 may be retained in cavity 230 using a metal, a rubber material, among other examples of materials that are configured to retain an object in a cavity.

As shown in FIG. 2, responder device 192-1 may be provided at a first location associated with wear surface 220 (e.g., within a first threshold distance from wear surface). For example, responder device 192-1 may be provided in cavity 230 at a first depth with respect to wear surface 220. While provided in cavity 230, responder device 192-1 may be able to provide one or more response magnetic signals to reader device 190. In this regard, by providing the one or more response magnetic signals to reader device 190, responder device 192-1 may provide (e.g., to reader device 190) an indication that responder device 192-1 is provided within cavity 230 and that wear surface 220 has not been worn away to the first depth.

A response magnetic signal (of the one or more response magnetic signals) may include information identifying responder device 192-1 (as explained above), information identifying first track link 172 (as explained above), information identifying a location of responder device 192-1 with respect to first track link 172, and/or information identifying a timestamp of the response magnetic signal, among other examples. The information identifying the location of responder device 192-1 may include information identifying the first depth, information identifying the first location, among other examples.

In some examples, based on responder device 192-1 providing the one or more response magnetic signals, reader device 190 may generate first wear information indicating a first amount of wear of first track link 172. The first wear information may indicate that first track link 172 has not been worn away to the first depth.

When wear surface 220 is worn away to the first depth, responder device 192-1 may fall out of cavity 230 and, as a result, may become unavailable and/or damaged. Accordingly, responder device 192-1 may fail to provide one or more response magnetic signals to reader device 190 because responder device 192-1 may be damaged and/or may be outside of a communication range for communicating with reader device 190. In this regard, by failing to provide one or more response magnetic signals to reader device 190, responder device 192-1 may provide (e.g., to reader device 190) an indication that responder device 192-1 is no longer provided within cavity 230 and that wear surface 220 has been worn away to the first depth.

Based on the indication (e.g., not receiving the one or more response magnetic signals from responder device 192-1), reader device 190 may generate second wear information indicating a second amount of wear of first track link 172. For example, the second wear information may indicate that first track link 172 has been worn away to the first depth. The first depth (and the first location) may be associated with the second amount of wear. The second amount of wear may exceed the first amount of wear.

As shown in FIG. 2, responder device 192-2 may be provided at a second location associated with wear surface 220 (e.g., within a second threshold distance from wear surface). For example, responder device 192-2 may be provided in cavity 230 at a second depth with respect to wear surface 220. The second threshold distance may exceed the first threshold distance and the second depth may exceed the first depth.

Responder device 192-2 may provide indications similar to the indications provided by responder device 192-1 based on providing one or more response magnetic signals to reader device 190. For example, by providing one or more response magnetic signals to reader device 190, responder device 192-2 may provide an indication that responder device 192-2 is provided within cavity 230 and that wear surface 220 has not been worn away to the second depth. Conversely, by failing to provide one or more response magnetic signals to reader device 190, responder device 192-2 may provide an indication that responder device 192-2 is no longer provided within cavity 230 and that wear surface 220 has been worn away to the second depth.

Based on responder device 192-2 providing the one or more response magnetic signals to reader device 190, reader device 190 may generate third wear information indicating that first track link 172 has not been worn to the second depth in a manner similar to the manner described above. Conversely, based on responder device 192-2 providing the one or more response magnetic signals to reader device 190, reader device 190 may generate fourth wear information indicating that first track link 172 has been worn to the second depth in a manner similar to the manner described above. The second depth may be associated with a third amount of wear that exceeds the second amount of wear.

While the foregoing example has been described with respect to a component of the undercarriage assembly of machine 100, the present disclosure is applicable to other components of machine 100, such as a tip, an adapter, a base edge, a cutting edge, a shroud, a half arrow, among other components of machine 100 that are subject to wear.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
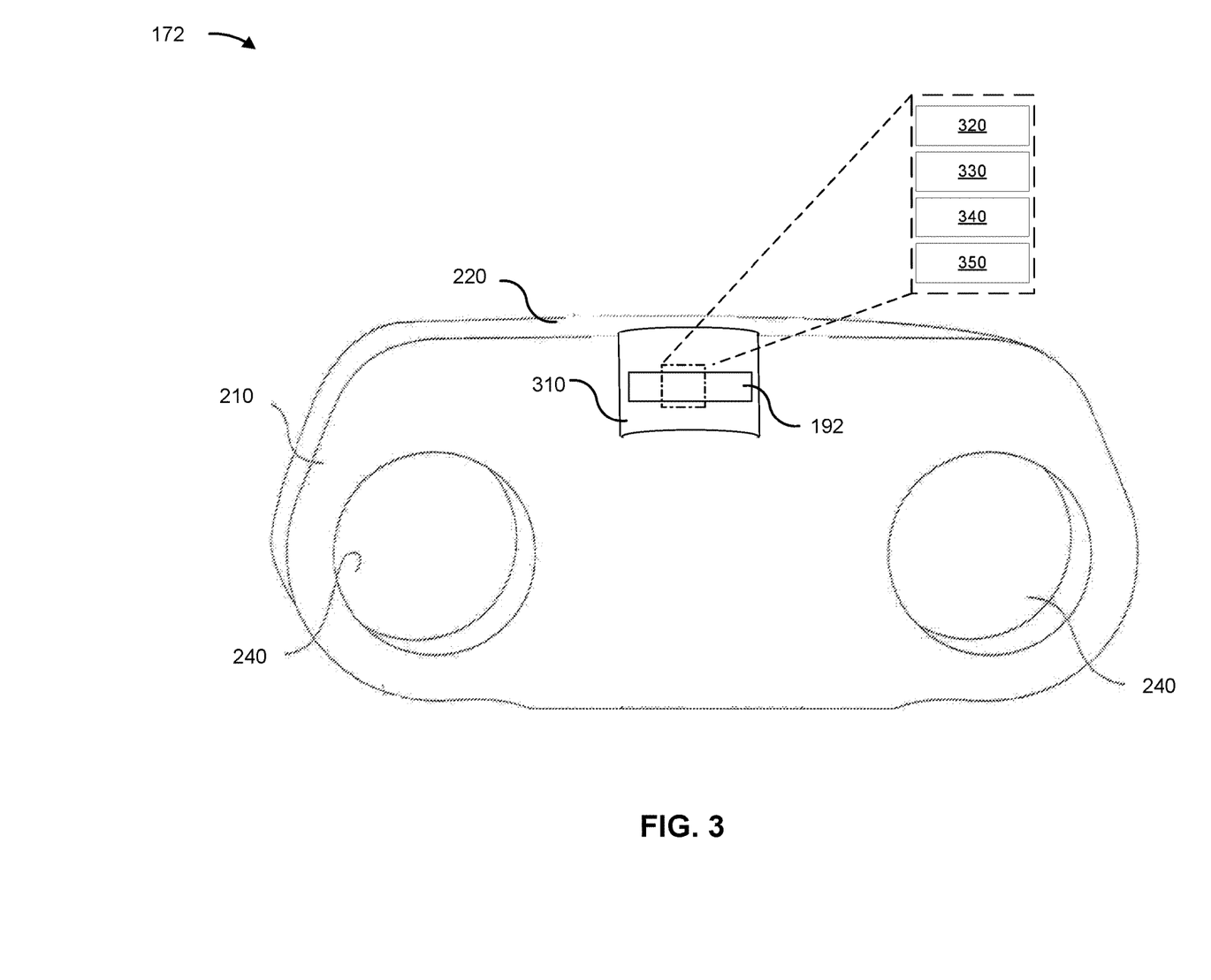
FIG. 3 is a diagram of an example component of the example machine described herein.

FIG. 3 is a diagram of an example component of machine 100 described herein. The example component is illustrated as first track link 172. The elements of first track link 172 have been described above in connection with FIG. 2. As shown in FIG. 3, first track link 172 may include a recessed surface 310 on an outer surface of first track link 172 (e.g., an outer surface of body 210). As shown in FIG. 3, recessed surface 310 may be configured to receive responder device 192. Responder device 192 may be provided on recessed surface 310 in different ways. For example, responder device 192 may be welded to first track link 172 (e.g., welded to recessed surface 310), may be bolted to first track link 172 (e.g., bolted to recessed surface 310), among other examples.

As shown in FIG. 3, responder device 192 may include a battery 320 (as described in connection with FIG. 1), a memory 330 (as described in connection with FIG. 1), a processor 340, and a sensor device 350 (as described in connection with FIG. 1). Memory 330 includes a random-access memory (RANI), a read only memory (ROM), and/or another type of dynamic or static storage device (e.g., a flash memory, a magnetic memory, and/or an optical memory)

that stores information and/or instructions for use by processor 340 to perform a function.

Processor 340 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 340 is implemented in hardware, firmware, and/or a combination of hardware and software. Processor 340 may be capable of being programmed to perform a function.

While the foregoing example has been described with respect to a component of the undercarriage assembly of machine 100, the present disclosure is applicable to other components of machine 100, such as a tip, an adapter, a base edge, a cutting edge, a shroud, a half arrow, among other components of machine 100 that are subject to wear.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example component may perform one or more functions described as being performed by another set of devices of the example component.

Figure 4:
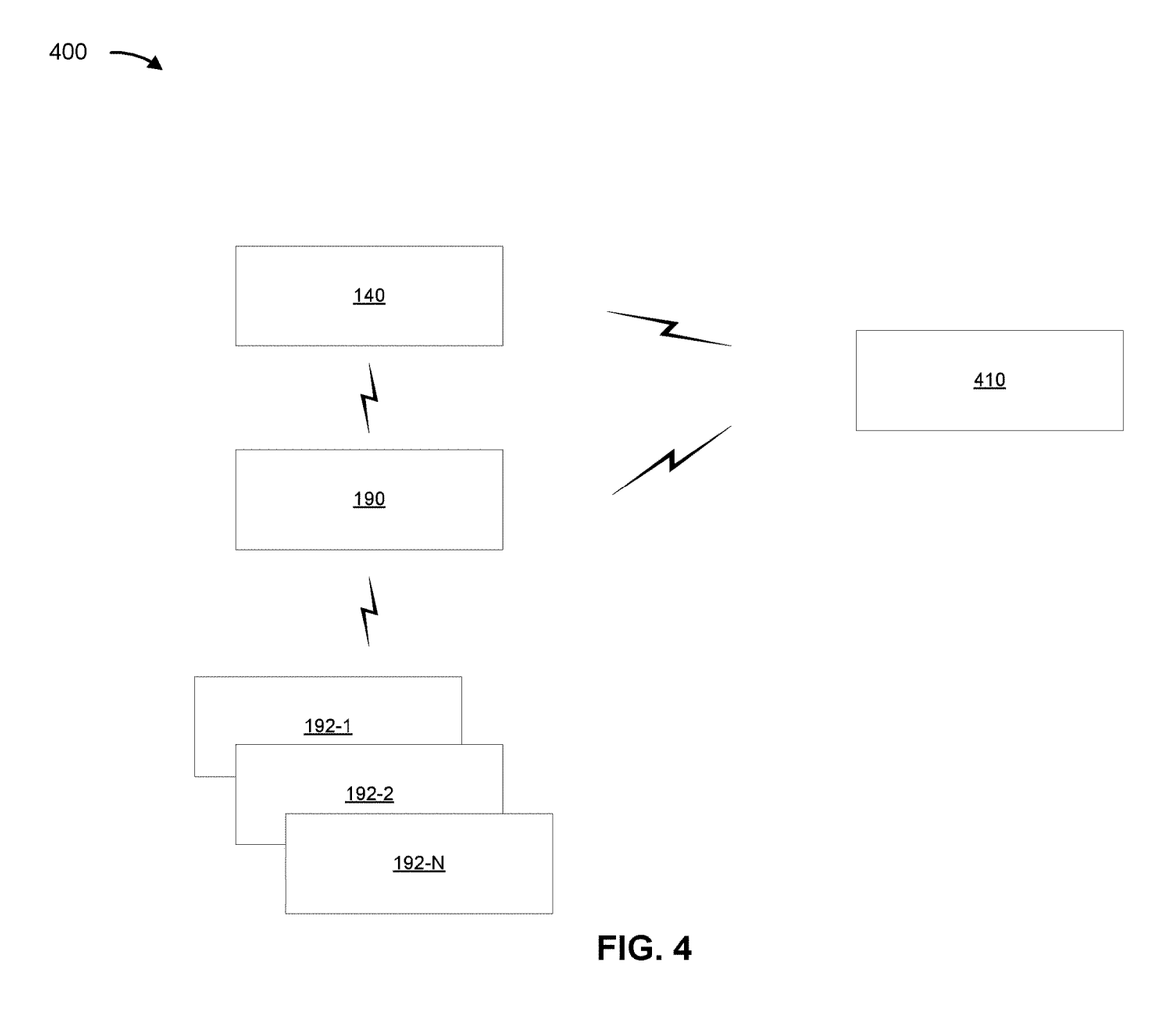
FIG. 4 is a diagram of an example system described herein.

FIG. 4 is a diagram of an example system 400 described herein. As shown in FIG. 4, system 400 includes controller 140, reader device 190, responder devices 192-1 through 192-N (referred to herein individually as "responder device 192," and collectively as "responder devices 192"), and a back office system 410. Responder devices 192 may be associated with one or more components of the undercarriage assembly, as explained above.

Controller 140 may be configured to cause one or more actions to be performed based on wear information for a component of machine 100. The one or more actions are described in more detail below. In some examples, reader device 190 may provide the wear information to cause controller 140 to cause the one or more actions to be performed. Reader device 190 may provide the wear information periodically (e.g., every 3 hours, every shift, every day, among other examples). Additionally, or alternatively, reader device 190 may provide the wear information based on a trigger (e.g., based on receiving a response magnetic signal from responder device 192, based on a request from controller 140, and/or based on a request from back office system 410, among other examples).

In some implementations, controller 140 may determine the wear information in a manner similar to the manner described above in connection with reader device 190 determining wear information. For example, controller 140 may receive (from reader device 190) one or more response magnetic signals from a responder device 192 associated with the component and/or nonresponsive information regarding the responder device 192.

The nonresponsive information may include information indicating that a response magnetic signal has not been received from the responder device 192, information identifying the responder device 192, information identifying a location of the responder device 192 on the component, information identifying a timestamp of a last response magnetic signal received from the responder device 192, information identifying a timestamp of a last interrogation magnetic signal provided by reader device 190 to the responder device 192, among other examples. Controller 140 may determine the wear information for the component based on the one or more response magnetic signals and/or the nonresponsive information.

Controller 140 may compare the amount of wear of the component (identified by the wear information) and a wear threshold. Information identifying the wear threshold may be stored in one or more memories associated with controller 140. In some situations, the wear threshold may be determined based on historical data regarding an amount of wear of one or more components at a time when the one or more components were replaced. The one or more components may be similar to the component with which the responder device 192 is associated.

Assume that the amount of wear of the component does not satisfy the wear threshold. Controller 140 may cause a notification to be provided. The notification may include information identifying the component, information identifying a location of the component on machine 100 (e.g., a depth of the responder device 192), information identifying the amount of wear of the component (e.g., the amount of wear associated with the location and/or the depth), and/or information identifying one or more components that are associated with and/or that are dependent on the component, among other examples.

The notification may be provided internally with respect to operator cabin 130, provided externally with respect to operator cabin 130, provided to a device of an operator of machine 100, and/or provided to back office system 410, among other examples.

Assume that the amount of wear of the component does satisfy the wear threshold. Controller 140 may cause one or more actions to be performed in addition to or alternatively to causing the notification to be provided. In this situation, the notification may further indicate that the component is to be replaced and/or repaired. With respect to the one or more actions, controller 140 may cause an adjustment of an operation of machine 100 to reduce and/or prevent additional wear of the component. For instance, controller 140 may reduce a speed of machine 100, may reduce the speed to bring machine 100 to a stop, and/or may immobilize machine 100, among other examples.

Additionally, or alternatively, to causing the adjustment of the operation of machine 100, controller 140 may provide an instruction to the operator to adjust the operation of the machine in a manner similar to the manner described above. Additionally, or alternatively, controller 140 may provide a service request to repair the component and/or to replace the component.

Additionally, or alternatively, controller 140 may cause machine 100 to autonomously navigate to a repair facility. Additionally, or alternatively, controller 140 may cause a calendar, of a technician, to be populated with a calendar event to inspect, repair, and/or replace the component. Additionally, or alternatively, controller 140 may cause an alarm to be activated. The alarm may indicate that the one or more components are to be repaired or replaced.

Additionally, or alternatively, controller 140 may provide a replacement request to a first autonomous device to cause the first autonomous device to deliver a replacement component to a location associated with machine 10. The location may include a current location of machine 100, a location of a work site where machine 100 performs multiple tasks, a location where machine 100 is stationed when machine 100 is not performing a task, and/or a location where machine 100 is stationed when machine 100 is undergoing repair and/or replacement. The replacement request may include information identifying the location associated with machine 100.

Additionally, or alternatively, to causing the first autonomous device to deliver the replacement component, controller 140 may provide a verification request to a second autonomous device to cause the second autonomous device to navigate to the location associated with machine 100 to verify the amount of wear of the component. The verification request may include information identifying the location associated with machine 100. The second autonomous device may generate verification information, based on verifying the component wear information, and may transmit the verification information to controller 140.

In some situations, the wear information may enable controller 140 to track the component. For example, based on the wear information, controller 140 may determine when the component is installed on the machine and/or when the component has been replaced on the machine. For example, controller 140 may analyze the wear information to identify a timestamp (e.g., date and/or time) associated with a first response magnetic signal received from the responder device 192. Controller 140 may determine that the timestamp is associated with a date and/or time when the component was first installed on machine 100. In some situations, based on determining that the timestamp is associated with the date and/or time when the component was first installed on machine 100 and depending on the location of the responder device 192, controller 140 may predict that the wear information indicates that the component has experienced minimal to no amount of wear.

In some situations, the one or more memories (associated with controller 140) may store a data structure. The data structure may include information about different responder devices 192 in association with a corresponding component and locations of the different responder devices 192 on the corresponding component. Assume that controller 140 determines, based on the data structure, that the responder device 192 is a last responder device 192 associated with the component or is the only responder device 192 associated with the component. Further assume that the wear information indicates that the responder device 192 has been removed from the component. Controller 140 may predict that a timestamp of a last response magnetic signal from the responder device 192 correlates with a date and/or time when the component is going to be repaired and/or replaced. Controller 140 may perform similar actions for one or more other components of machine 100.

Back office system 410 may include one or more devices that are configured to monitor components of machine 100. Back office system 410 may be remote with respect to machine 100. In some implementations, back office system 410 may perform actions similar to the actions described above in connection with controller 140. For example, back office system 410 may receive the wear information from controller 140 and/or from reader device 190. Alternatively, back office system 410 may determine the wear information in a manner similar to the manner described above in connection with controller 140 determining the wear information. Based on the wear information, back office system 410 may perform actions similar to the actions described above in connection with controller 140.

The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of system 400 may perform one or more functions described as being performed by another set of devices of system 400.

INDUSTRIAL APPLICABILITY

The present disclosure is directed to using devices, that communicate using magnetic signals, to monitor a component of a machine. For example, the devices may be used to detect an amount of wear of a component and to track the component (e.g., to determine whether the component has been installed and/or replaced). The component may include a metal and may be a component of an undercarriage assembly, such as a roller, an idler, a track link, a track link bushing, and/or a sprocket segment, among other examples. Unlike electromagnetic signals, the magnetic signals are not subject to interference that may be caused by a metal.

The devices may communicate using a near-field magnetic signaling communication protocol. For instance, the devices may communicate in accordance with the Institute of Electrical and Electronics Engineers (IEEE) 1902.1 standard. The devices may operate in a long wavelength band using a magnetic field. For example, the devices may operate in a wavelength of approximately 1.25 miles. Additionally, or alternatively, the devices may use low frequency, such as approximately 131 Kz. Information, provided by such devices, is not subject to reflections and is not blocked by metals (e.g., steel) or liquids. Therefore, the information, provided by such devices, is volumetric (e.g., not line-of-sight).

Metals may reflect electromagnetic energy and cause an interference with electromagnetic signals of an RFID system. As a result, an amount of wear (of components) measured by the RFID system may be inaccurate. Inaccurate measurements of the amount of wear of the components may result in incorrect predictions regarding the amount of wear of the components. As a result of such incorrect predictions, the components may either fail prematurely or may be repaired or replaced prematurely (e.g., because the components may not be sufficiently worn to require replacement or repair).

The present disclosure resolves these issues by using devices, that communicate using magnetic signals, to monitor the component of the machine. Information (provided by the devices) identifying an amount of wear of the component is not subject to interference caused by metals. Accordingly, the information identifying the amount of wear is more accurate than similar information provided using electromagnetic signals. As a result of the improved accuracy, the component may be repaired or replaced when a repair or a replacement of the component is needed (as opposed to the component being repaired or replaced prematurely).

Additionally, as a result of the improved accuracy, the devices may help reduce a possibility of failure of the component prior to repair and/or replacement of the component. Additionally, as a result of the improved accuracy, the devices may preserve computing or machine resources that would have otherwise been used to remedy issues associated with inaccurate predictions of the amount of wear of the component (e.g., premature failure of the component, premature repair of the component, and/or premature replacement of the component).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
   a first responder device;
   a second responder device; and
   a reader device configured to:
      provide one or more interrogation magnetic signals to the first responder device, wherein the one or more interrogation magnetic signals are different from electromagnetic signals, and wherein the one or more interrogation magnetic signals are configured to penetrate a metal;
      receive, based on providing the one or more interrogation magnetic signals and from the first responder device, a first response magnetic signal that includes information identifying a first depth at which the first responder device is provided within a cavity of a track link of a machine and that indicates that a wear surface of the track link has not been worn away to the first depth, wherein the cavity is between track through holes of the track link;
      provide, based on receiving the first response magnetic signal, first wear information indicating a first amount of wear of the track link;
      receive, from the second responder device, a second response magnetic signal that includes information identifying a second depth at which the second responder device is provided within the cavity of the track link and that indicates that the wear surface of the track link has not been worn away to the second depth, wherein the second depth exceeds the first depth; and
      provide, based on receiving the second response magnetic signal, second wear information indicating a second amount of wear of the track link.

2. The system of claim 1, wherein, to provide the second wear information, the reader device is configured to:
   provide the second wear information to a controller of the machine to cause the controller to provide a notification indicating the second amount of wear.

3. The system of claim 1, wherein, to provide of the second wear information, the reader device is configured to:
   provide the second wear information to a controller of the machine to cause the controller to cause an adjustment of an operation of the machine to prevent additional wear of the track link.

4. The system of claim 1, wherein, to provide the second wear information, the reader device is configured to:
   provide the first wear information to a controller that is configured to monitor the track link.

5. The system of claim 4, wherein, to provide the second wear information, the reader device is configured to:
   provide the second wear information to the controller to cause the controller to at least one of:
      provide a service request to at least one of repair or replace the track link, or
      provide an instruction to an operator, of the machine, to adjust the operation of the machine to prevent additional wear of the track link.

6. The system of claim 1, wherein, to provide the one or more interrogation magnetic signals, the reader device is configured to:
   provide the one or more interrogation magnetic signals using a near-field magnetic signaling communication protocol.

7. A component of a machine, the component comprising:
   a body;
   a first RuBee tag configured to:
      receive a first interrogation magnetic signal, and
      provide, based on the first interrogation magnetic signal, a first response magnetic signal that indicates a first depth at which the first RuBee tag is provided within a cavity of the body and that a wear surface of the body has not been worn away to the first depth; and
   a second RuBee tag configured to provide, based on a second interrogation magnetic signal, a second response magnetic signal that indicates a second depth at which the second RuBee tag is provided within the cavity of the body and that the wear surface of the body has not been worn away to the second depth,
   wherein the first response magnetic signal, the first interrogation magnetic signal, the second response magnetic signal, and the second interrogation magnetic signal are different from electromagnetic signals.

8. The component of claim 7,
   wherein the first response magnetic signal includes information identifying the component, information identifying the first RuBee tag, and information identifying the first depth, and
   wherein the first depth is associated with a first amount of wear.

9. The component of claim 8,
   wherein the second response magnetic signal includes the information identifying the component, information identifying the second RuBee tag, and information identifying the second depth, wherein the second depth is associated with a second amount of wear, and wherein the second amount of wear exceeds the first amount of wear.

10. The component of claim 9, wherein, to provide the first response magnetic signal, the first RuBee tag is configured to provide the first response magnetic signal in accordance with Institute of Electrical and Electronics Engineers (IEEE) 1902.1 standard, and wherein, to provide the second response magnetic signal, the second RuBee tag is configured to provide the second response magnetic signal in accordance with the IEEE 1902.1 standard.

11. A machine, comprising:
a track link;
a first device;
a second device configured to:
provide one or more interrogation magnetic signals to the first device, wherein the one or more interrogation magnetic signals are different from electromagnetic signals;
receive, based on providing the one or more interrogation magnetic signals, a response magnetic signal that includes information identifying a first depth at which the first device is provided within a cavity of the track link, that indicates that a wear surface of the track link has not been worn away to the first depth, and that includes information identifying a timestamp of the response magnetic signal; and
provide first wear information indicating a first amount of wear of the track link based on the response magnetic signal; and
a controller configured to cause an action to be performed based on the first wear information.

12. The machine of claim 11, wherein, to cause the action to be performed, the controller is configured to:
cause an adjustment of an operation of the machine to prevent additional wear of the track link.

13. The machine of claim 11,
wherein, to cause the action to be performed, the controller is configured to:
provide a service request to at least one of repair or replace the track link.

14. The machine of claim 11,
wherein the cavity of the track link is between track through holes of the track link,
wherein a size of the cavity, of the track link, is greater than at least twice a size of the first device, and
wherein the cavity, of the track link, is configured to receive the first device and retain the first device using a metal.

15. The machine of claim 11, wherein the second device is configured to communicate with the first device using Institute of Electrical and Electronics Engineers (IEEE) 1902.1 standard.

16. The machine of claim 11, wherein, to provide the first wear information, the second device is configured to:
provide the first wear information to a controller; and
wherein the second device is further configured to:
provide second wear information to the controller to cause the controller to:
cause an adjustment of an operation of the machine to prevent additional wear of the track link, or
provide a service request to at least one of repair or replace the track link.

17. The system of claim 1, wherein the first response magnetic signal further includes information identifying the first responder device, information identifying the track link, and information identifying a timestamp associated with the first response magnetic signal.

18. The system of claim 17, wherein the information identifying the first responder device includes information identifying a manufacturer of the first responder device, information identifying a model of the first responder device, and information identifying a serial number of the first responder device.

19. The system of claim 17, wherein the information identifying the track link includes information identifying a manufacturer of track link, information identifying a model of the track link, information identifying a part number of the track link, information identifying a serial number of the track link, and information identifying one or more of a day or time when the track link was installed on the machine.

20. The system of claim 1,
wherein the first responder device includes one or more sensor devices, and
wherein the first response magnetic signal further includes sensor data from the one or more sensor devices.

* * * * *